United States Patent [19]

Schlösser

[11] Patent Number: 5,012,550
[45] Date of Patent: May 7, 1991

[54] CASTER WITH BRAKE

[75] Inventor: Klaus Schlösser, Bochum, Fed. Rep. of Germany

[73] Assignee: Wicke GmbH & Co., Sprockhövel-Herzkamp, Fed. Rep. of Germany

[21] Appl. No.: 568,255

[22] Filed: Aug. 15, 1990

[30] Foreign Application Priority Data

Aug. 16, 1989 [AT] Austria ............................... 1942/89

[51] Int. Cl.$^5$ ............................................. B60B 33/00
[52] U.S. Cl. ................................. 16/35 R; 188/1.12
[58] Field of Search ....................... 16/35 R; 188/1.12

[56] References Cited

U.S. PATENT DOCUMENTS

| 1,778,167 | 10/1930 | Roe | 16/35 R |
| 1,895,150 | 1/1933 | Darnell | 16/35 R |
| 3,949,444 | 4/1976 | Mattinson | 16/35 R |

FOREIGN PATENT DOCUMENTS 3426443 1/1986 Fed. Rep. of Germany .
882617 11/1961 United Kingdom ............... 16/35 R Primary Examiner—Richard K. Seidel
Assistant Examiner—Carmine Cuda
Attorney, Agent, or Firm—Peter K. Kontler

[57] ABSTRACT

A caster wherein an upright stub carries a swivel bearing for an inverted U-shaped frame having legs which support the shaft for a wheel. The shaft is movable sideways in elongated horizontal slots of the legs in response to depression or lifting of a pedal which is pivotably connected to the legs. The pedal has two arms which flank the legs of the frame and are provided with substantially S-shaped slots crossing the slots of the adjacent legs and receiving portions of the shaft. When the pedal is depressed, the wheel frictionally engages and displaces a plate-like brake member which is vertically movably mounted in the legs of the frame and can be moved into direct frictional engagement with that part of the bearing which is non-rotatably connected to the stub. Alternatively, the plate-like brake member can be moved into direct frictional engagement with bolts which secure the web of the frame to one race of the bearing whereby the brake member displaces a pin which is reciprocably mounted in the web and in the one race and moves into frictional engagement with another race which is rigid with the stub.

18 Claims, 3 Drawing Sheets

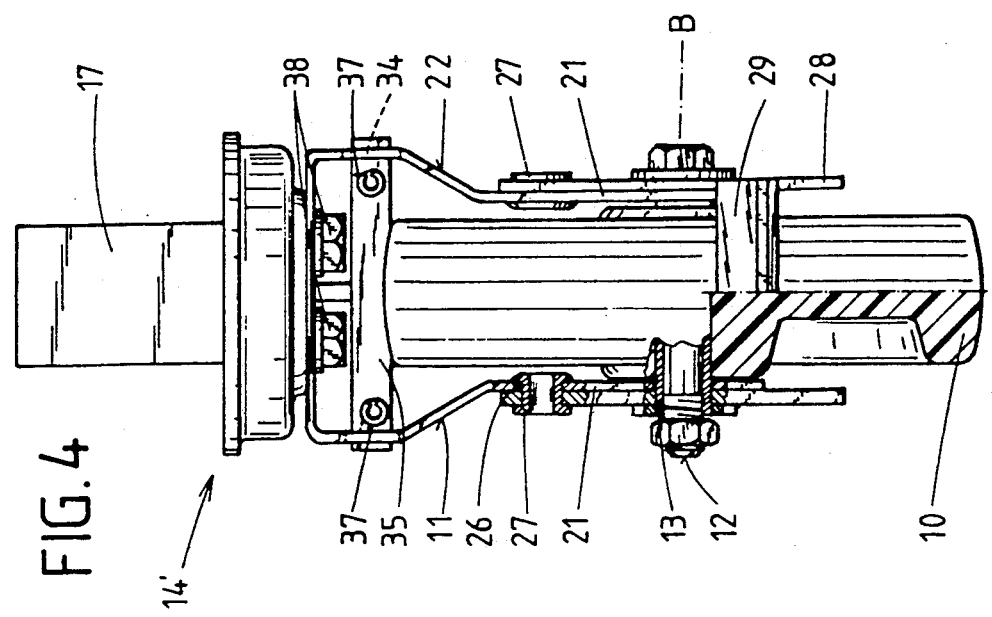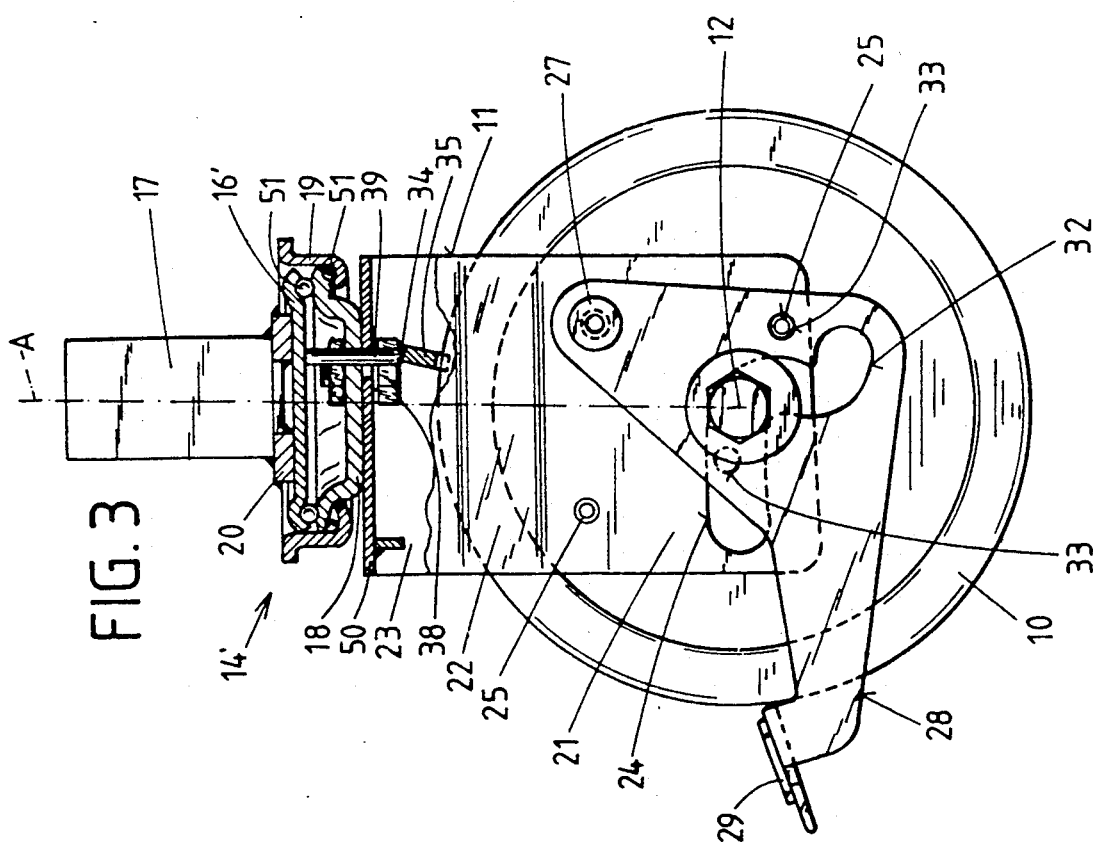

CASTER WITH BRAKE

BACKGROUND OF THE INVENTION

The invention relates to casters in general, and more particularly to improvements in casters with brakes for their wheels. Such casters can be used on the legs of tables, chairs, beds, scaffolds and many other mobile structures.

It is already known to provide a caster with a support which can be removably or permanently secured to the leg of a table, chair or other mobile structure and carries a swivel bearing for the web of an inverted U-shaped frame having two legs which flank a wheel and support the ends of a shaft defining a horizontal axis for the wheel. The swivel bearing enables the frame to turn about a substantially vertical axis.

It is also known to provide a caster with a brake which can be actuated to prevent rotation of the wheel about the horizontal axis and to simultaneously prevent turning of the wheel frame about the vertical axis. To this end, the legs of the frame have slots for the shaft which supports the wheel, and the frame pivotably supports a pedal which can be moved relative to the frame to displace the shaft in the slots of the legs to a position in which the wheel frictionally engages and displaces a brake into frictional engagement with the wheel frame.

Published German patent application No. 34 26 443 discloses a caster wherein the support includes an upright stud the lower end portion of which carries two races flanking the web of the inverted U-shaped wheel frame. Rolling elements are disposed between the web and each of the two races in order to reduce friction and to permit the frame and the wheel to turn about the vertical axis of the stud. The downwardly extending legs of the frame flank the wheel and have slots for the shaft which supports and defines a horizontal axis for the wheel. The legs of the wheel frame pivotably support the arms of a pedal which has cam slots crossing the slots of the respective legs and receiving portions of the shaft. When the pedal is depressed, the surfaces bounding its slots displace the shaft in the slots of the legs to a position in which the axis of the wheel crosses the axis of the stud and the wheel is held against rotation about its axis. When the pedal is moved to an inoperative position, the axis of the wheel is laterally offset with reference to the axis of the stud and the wheel is free to rotate about its own axis which is located behind the axis of the stud when the mobile structure utilizing the caster is set in motion. The wheel frame of the just described caster does not move in response to movement of the shaft in the slots of the two legs. The means for holding the wheel against rotation in response to depression of the pedal includes a brake which is fixed to the legs of the wheel frame and is engaged by the wheel in response to depression of the pedal. A drawback of this caster is that any play between the races of the swivel bearing can affect the stability of the mobile structure, especially if the latter is a tall scaffold or a working platform serving to support workers and/or equipment at a considerable distance from the ground.

OBJECTS OF THE INVENTION

An object of the invention is to provide a caster which is constructed and assembled in such a way that it can compensate for manufacturing and/or other tolerances between the parts of the bearing which rotatably connects the wheel frame to its support.

Another object of the invention is to provide a caster which is constructed and assembled in such a way that any play between the component parts of the bearing is automatically eliminated when the wheel is braked.

A further object of the invention is to provide a novel and improved brake for use in the above outlined caster.

An additional object of the invention is to provide novel and improved means for moving the wheel and its shaft relative to the frame of the above outlined caster.

Still another object of the invention is to provide a caster which is constructed and assembled in such a way that the wheel is automatically held against rotation about the axis which is defined by the swivel bearing in response to its engagement with a brake which prevents the wheel from rotating about its own axis.

A further object of the invention is to provide a novel and improved method of mounting the wheel brake in the frame of the above outlined caster.

SUMMARY OF THE INVENTION

The invention resides in the provision of a caster for use on the legs of mobile scaffolds, tables, beds and other mobile structures. The improved caster comprises a support which is connectable to a mobile structure (such as to a leg of a mobile platform, serving cart, bed, table or the like), and a preferably U-shaped wheel frame having a portion (such as the web between the legs of a U) which is adjacent the support, a bearing which connects the frame portion to the support for angular movement about a first axis (this axis is normally vertical or nearly vertical when the caster is in use). The frame further comprises a pair of legs which are rigid with and extend from the frame portion in a direction away from the support, and each such leg has an elongated slot which extends substantially transversely of the first axis. The caster further comprises a shaft which extends into and is movable in the slots of the legs substantially transversely of the first axis, a wheel mounted on the shaft for rotation about a second axis which is substantially normal to the first axis, a brake which is mounted in the frame and is movable by the wheel into and from frictional engagement with the support and with the wheel in response to movement of the shaft relative to the frame between first and second positions, and means for moving the shaft between the first and second positions.

The support can include a fastener (e.g., an elongated stud which can be inserted into a socket in the leg of a movable table or another mobile structure) which defines the first axis, and an abutment which is rigid with the fastener and is frictionally engaged by the brake in the first position of the shaft.

The brake can include a plate-like member which has a substantially rectangular cross-sectional outline. The plate-like member is or can be elongated, and the legs of the frame can be provided with aligned guide slots which slidably receive the end portions of the plate-like member. Such guide slots are or can be substantially parallel to and are preferably adjacent but still spaced apart from the first axis.

The bearing can comprise a race which is rotatable relative to the support about the first axis, and the caster can further comprise means (e.g., screws or bolts and nuts) for securing the race to the frame. The brake can include a first member (such as the aforementioned plate-like member) which is reciprocably guided by the frame and is frictionally engaged by the wheel in the first position of the shaft, and a second member which is biased by the first member against the support in the first position of the shaft. The bearing can include a second race which is part of the support and at least one annulus of antifriction rolling elements between the two races. The second member of the brake bears upon the second race in the first position of the shaft. This second member can include or constitute a pin which is reciprocable relative to and extends through the first mentioned race and through the aforementioned portion of the frame.

The caster preferably further comprises means for limiting the movability of the plate-like member relative to the frame in parallelism with the second axis. The plate-like member is movable substantially radially of the wheel in response to movement of the shaft between its first and second positions. The limiting means can comprise projections on the plate-like member. The projections are preferably adjacent the inner sides of the legs, i.e., adjacent those sides of the legs which confront and flank the wheel. In accordance with a presently preferred embodiment, the plate-like member can comprise an elongated leaf spring with suitably bent end portions which constitute the aforementioned limiting means and control the extent of movability of the late-like member in parallelism with the second axis.

The moving means preferably comprises a pedal which is pivotably mounted on the legs of the frame and has suitably configurated slots for the shaft. The pedal can include a first motion receiving portion which is depressible to move the shaft of the first position, and a second motion receiving portion which is depressible to move the shaft to the second position. Such pedal can be said to constitute or to resemble a two-armed lever. If the pedal is or resembles a one-armed lever, it can be depressed in one direction to move the shaft to the first position and must be pulled or pushed in the other direction to move the shaft to the second positions.

The novel features which are considered as characteristic of the invention are set forth in particular in the appended claims. The improved caster itself, however, both as to its construction and the mode of assembling and using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 3 is a view similar to that of FIG. 1 but showing a second caster wherein the brake comprises two members one of which can be engaged by the wheel and the other of which can engage the support for the wheel frame;

FIG. 4 is an end elevational view of the second caster, with one leg of the frame and certain other components partly broken away;

DESCRIPTION OF PREFERRED EMBODIMENTS

Figure 2:
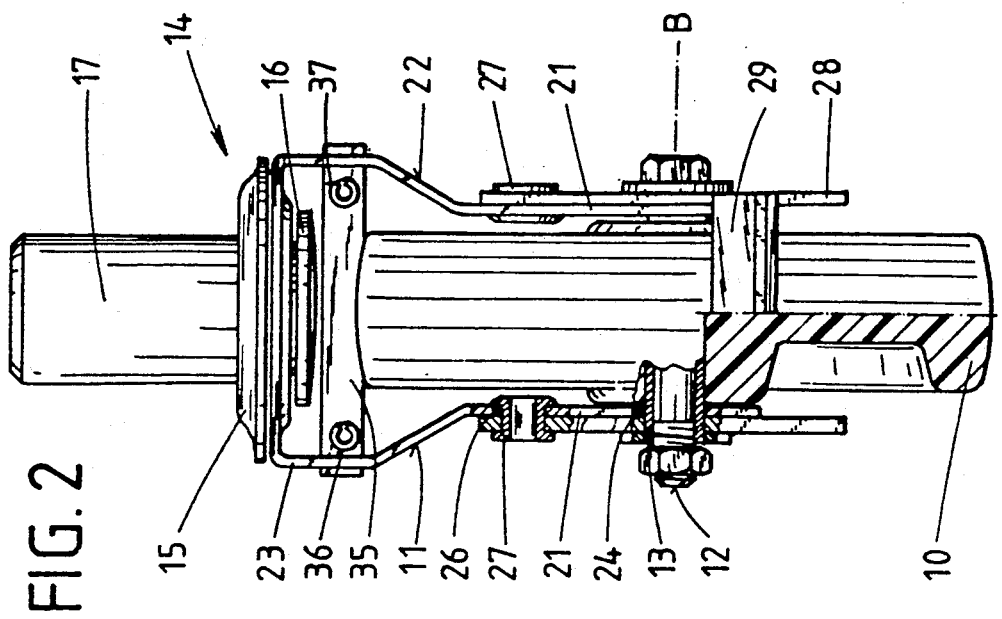
FIG. 2 is an end elevational view of the caster, with one leg of the frame and certain other components partly broken away.
Figure 1:
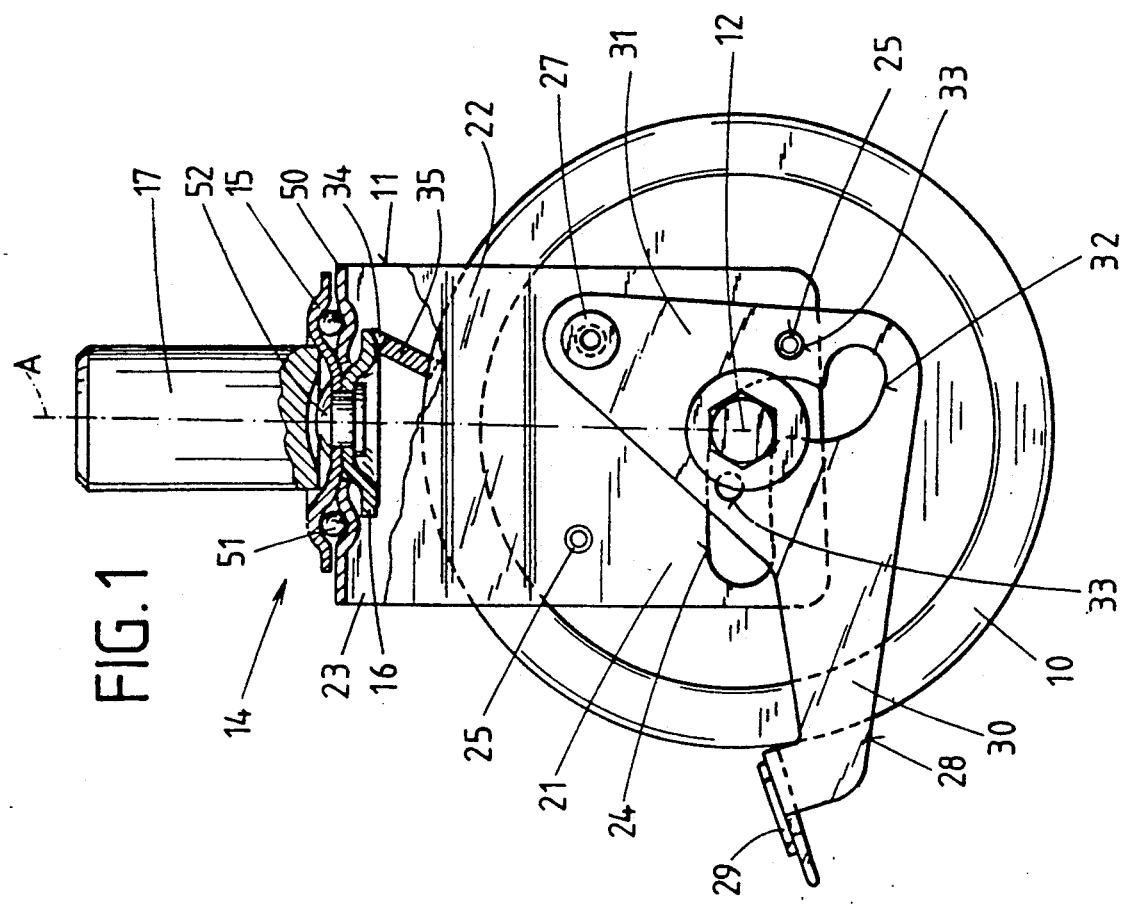
FIG. 1 is a side elevational view of a caster which embodies one form of the invention, the bearing between the support and the frame being shown in an axial sectional view.

FIGS. 1 and 2 show a caster which embodies one form of the invention and comprises a support having a fastener in the form of stub 17 receivable in the socket (not shown) of a leg forming part of a mobile scaffold, a mobile table or any other mobile structure which is to be mounted on two or more casters. The construction of the mobile structure which can be mounted on casters of the type shown in FIGS. 1 and 2 forms no part of the invention. The stub 17 can constitute a rigid metallic or plastic part or a tube.

The lower end portion of the stub 17 carries a swivel bearing 14 for the inverted U-shaped frame 11 having legs 21 which flank a wheel 10. The wheel 10 can be rotated about the horizontal axis B of a shaft 12 which is normal to the vertical axis A of the stub 17 and swivel bearing 14. The wheel 10 is an idler wheel and its shaft 12 is mounted in a bearing sleeve 13 having end portions extending through and outwardly beyond aligned elongated substantially horizontal slots 24 in the lower end portions of the legs 21. The illustrated shaft 12 is assembled of an elongated bolt which has a head outwardly adjacent one of the legs 21 and a shank having threads mating with internal threads of a nut adjacent the outer side of the other leg 21.

The frame portion or web 50 between the legs 21 of the frame 11 has a centrally located portion which constitutes one race of the swivel bearing 14. Another race 15 of this bearing is welded or otherwise rigidly secured to the lower end portion of the stub 17 and cooperates with the race 15 to confine an annulus of spherical rolling elements 51. The race 15 is riveted to an abutment 16 in the form of a collar which is rigid with the stub 17 and can be said to form part of a composite support including the stub 17, the upper race 15, the abutment 16 and the rivet 52.

Each leg 21 includes a substantially vertical lower portion which is provided with the respective slot 24, an upwardly and outwardly sloping median portion 22, and a substantially vertical upper portion 23 which is rigid with the adjacent portion of the web 50. The right-hand end portions of the slots 24 (as seen in FIG. 1) are or can be slightly enlarged in a direction toward the bearing 14. The lower portion of each leg 21 is provided with two outwardly extending protuberances 25 which can be formed by making dents in the inner sides of the respective legs. As can be seen in FIG. 1, the two protuberances 25 in each leg 21 are disposed substantially diametrically opposite each other with reference to the shaft 12.

Each leg 21 is further provided with a bore 26 for a hollow rivet 27 or another suitable connecting device for the respective section of a pivotable pedal 28 serving as a means for moving the shaft 12 in the slots 24 of the legs 21. The pedal 28 which is shown in FIGS. 1 and 2 is a one-armed lever which is pivotable relative to the frame 11 about the common axis of the rivets 27 and each section of which has a substantially S-shaped slot 32 crossing the respective slot 24 and receiving a portion of the shaft 12. The free ends of the two parallel plate-like sections of the pedal 28 are connected to each other by a motion receiving platform 29 which can be stepped upon or otherwise depressed to move the shaft 12 to a first position which is shown in FIG. 1 and in which the axis B crosses the axis A and the wheel 10 is held against rotation relative to the frame 11. At the same time, the frame 11 is held against rotation about the axis A relative to the support 15-17.

Each section of the pedal 28 is substantially L-shaped; it includes a relatively narrow portion 30 adjacent the platform 29 and a relatively wide portion 31 which is pivotable about the axis of the respective rivet 27. The slots 32 are provided in the regions of junctions of the portions 30, 31. Each of these slots has two curved end portions which are connected to each other by a substantially straight median portion. The shaft 12 extends into one curved end portion of each slot 32 in the illustrated (first) position, and into the other end portion of each slot 32 in the other (second) position. Those portions of the pedal sections which are adjacent the ends of straight median portions of the respective slots 32 are or can be provided with suitable projections (not shown) acting as detents or stops for the sleeve 13 to releasably hold the shaft 12 in the respective position. This ensures that the shaft 12 cannot be accidentally moved longitudinally of the slots 24 in the legs 21 of the frame 11. Additional detent means for the shaft 12 include the aforementioned protuberances 25 on the legs 21; such protuberances can snap into complementary recesses or holes 33 in the respective sections of the pedal 28. The recesses or holes 33 are bounded by smooth surfaces. Each section of the pedal 28 has a single recess 33, and these recesses are provided at opposite sides of the slots 32. The arrangement is such that the recess 33 of one section of the pedal 28 receives a protuberance 25 of the adjacent leg 21 in one end position of the shaft 12 and the recess 33 of the other section of the pedal 28 receives a protuberance 25 of the adjacent leg 21 in the other end position of the shaft.

The upper portions 23 of the legs 21 are formed with aligned guide slots 34 for the end portions of a plate-like member 35 which constitutes a brake for the wheel 10 as well as for the frame 11, i.e., this plate-like member 35 can prevent rotation of the wheel 10 about the axis B and it can also prevent turning of the frame 11 about the axis A. The slots 34 are substantially but not exactly vertical and are adjacent but still spaced apart from the axis A. The width of the slots 34 can closely approximate the thickness of the plate-like member 35 but their length exceeds the width of the member 35 so that the latter has a certain freedom of movement toward and away from the underside of the abutment 16 which forms part of the support for the frame 11.

The means for limiting reciprocatory movements of the member 35 in parallelism with the axis B includes two projections 36, 37 which are provided on the member 35 and are adjacent the inner sides of the respective legs 21. This can be readily seen in FIG. 2. Each projection can constitute a pin which extends through the respective end portion of the member 35. Alternatively, and as shown in FIG. 2, each of the projections 36, 37 can constitute a slotted sleeve which tends to expand and is received in a transverse bore or hole in the respective end portion of the member 35.

The distance between the uppermost portion of the peripheral surface of the wheel 10 and the underside of the abutment 16 is selected in such a way that, when the shaft 12 is moved to the (first) position of FIG. 1, the peripheral surface of the wheel 10 is in requisite frictional engagement with the lower edge face of the member 35 and the upper edge face of this member is in requisite frictional engagement with the underside of the abutment 16, i.e., in direct frictional engagement with the support 15-17. If the pedal 28 is thereupon pivoted in a clockwise direction, as seen in FIG. 1, the shaft 12 is caused to enter the other end portions of the slots 32 and travels along the slots 24 in a direction to the left so that the peripheral surface of the wheel 10 is disengaged from the lower edge face of the member 35 and the upper edge face of the member 35 is free to descend below the abutment 16. The mass of the member 35 suffices to ensure that this member descends into abutment with the surfaces at the bottoms of the slots 34 as soon as the wheel 10 is moved out of the way. Thus, the frame 11 is free to swivel about the axis A as soon as the wheel 10 is free to rotate about the axis B.

An important advantage of the improved caster is that the mobile braking member 35 can compensate for play (if any) in the swivel bearing 14. Thus, when the shaft 12 is held in the position of FIG. 1, the member 35 acts directly between the peripheral surface of the wheel 10 and the abutment 16 (which is a component part of the support 15-17) to thus eliminate the influence of play (if any) between the components of the swivel bearing 14. In the embodiment of FIGS. 1 and 2, the brake member 35 is designed to directly engage the abutment 16 of the support 15-17. Thus, a reliable form-locking connection is established between the support 15-17 and the wheel 10 as soon as the shaft 12 reaches the position which is shown in FIG. 1. Moreover, by acting directly between the wheel 10 and the abutment 16, the brake member 35 prevents rotation of the wheel 10 about the axis B while simultaneously preventing turning of the frame 11 (and hence of the wheel 10) about the axis A. In addition, the brake member 35 relieves the shaft 12 when the latter reaches the position of FIG. 1 and the blocked wheel 10 can take up a greater load.

It has been found that a brake member 35 having a substantially rectangular cross-sectional outline and having end portions movable in substantially vertical guide slots 34 exhibits several advantages. Such design of the brake member is desirable for static reasons as well as because one achieves a controlled bypass movement. The positioning of guide slots 34 in such a way that they are adjacent to but still slightly spaced apart from the axis A exhibits the advantage that the member 35 properly brakes the wheel 10 against rotation about the axis B and reliably holds the frame 11 against turning about the axis A when the shaft 12 assumes the position of FIG. 1 even if the wheel 10 has already undergone a certain amount of wear.

FIGS. 3 and 4 show a second caster. All such parts of this caster which are identical with or clearly analogous to the corresponding parts of the caster of FIGS. 1 and 2 are denoted by similar reference characters. The bearing 14' of the caster of FIGS. 3 and 4 has a first race 16' which is rigidly secured (e.g., welded) to the lower end portion of the stub 17 by a washer 20. Th eperiphery of the race 16' is rigidly secured (e.g., welded) to a cupped ring 19. The ring 19 can be said to constitute a second race of the bearing 14' and the latter further comprises a cupped third race 18 which is fixedly secured to the web 50 of the frame 11 by two spaced-apart threaded connectors 38. The bearing 14' has two annuli of spherical antifriction rolling elements 50, one between the races 16', 18 and the other between the races 18, 19.

The brake in the caster of FIGS. 3 and 4 comprises a plate-like first member 35 which is or can be identical with the similarly referenced member in the caster of FIGS. 1 and 2, and a pin- or stud-shaped second member 39 which rests on the upper edge face of the member 35 between the threaded connectors 38. The pin 39 extends transversely of and is reciprocable in aligned holes or bores of the web 50 and race 18 and frictionally engages the underside of the abutment or race 16' when the member 35 is frictionally engaged and lifted by the peripheral surface of the wheel 10, i.e., when the shaft 12 assumes the end position which is shown in FIG. 3. At such time, the upper edge face of the member 35 bears against the threaded connectors 38 to thus prevent rotation of the wheel 10 relative to the frame 11 and, at the same time, the upper edge face of the member 35 urges the pin 39 into frictional engagement with the race 16' to thus prevent the frame 11 from turning about the axis A.

An advantage of the caster of FIGS. 3 and 4 is that the two-piece brake 35, 39 can establish a form-locking connection between the support 16', 17, 19, 20 and the wheel 10 even though the web 50 of the frame 11 does not constitute a component part of the swivel bearing 14'. The plate-like member 35 can hold the wheel 10 against rotation relative to the frame 11, and the pin 39 can hold the frame 11 and the wheel 10 against turning relative to the support including the stub 17.

Figure 5:
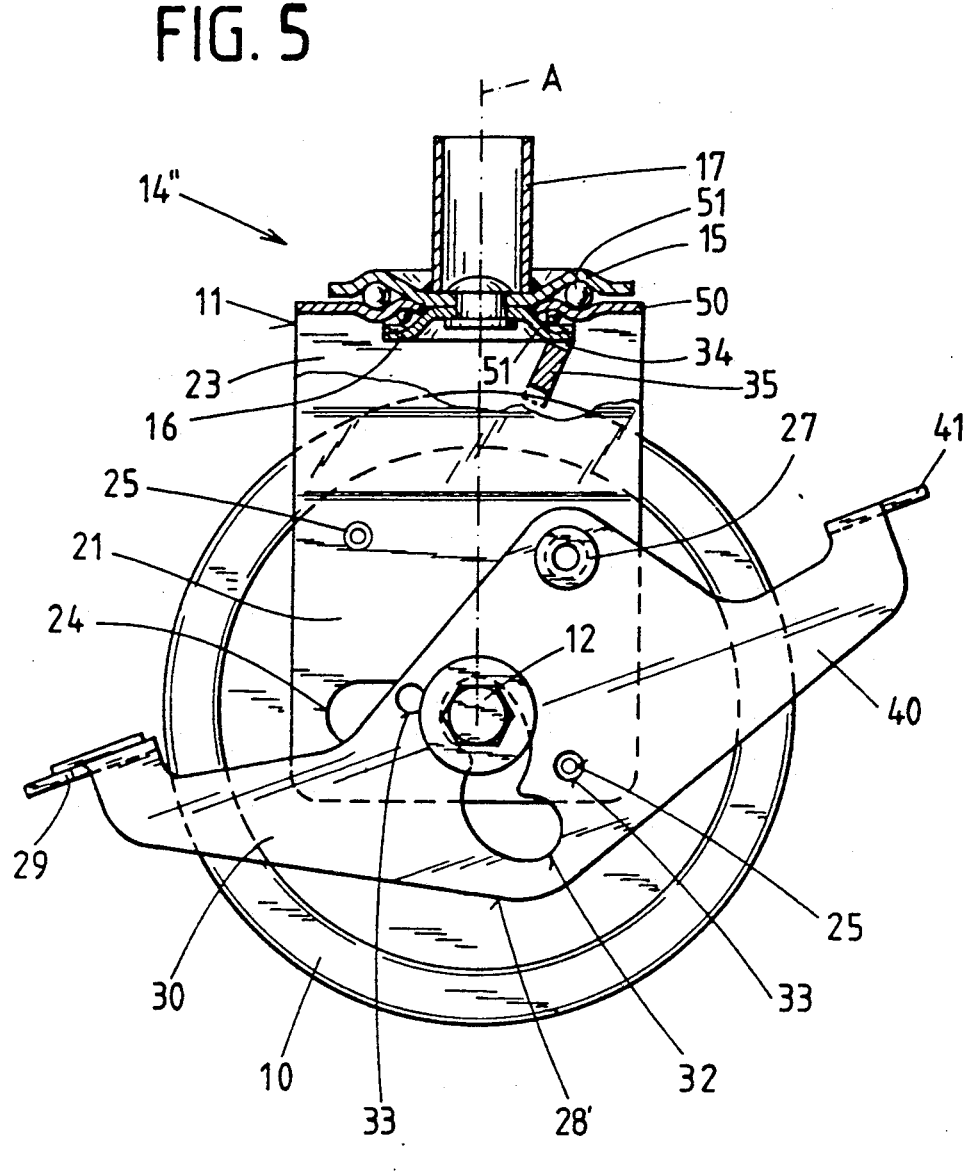
FIG. 5 is a partly side elevational and partly vertical sectional view of a third caster wherein the means for moving the shaft and the wheel relative to the frame comprises a pedal in the form of a two-armed lever.

FIG. 5 shows a third caster which, save for the bearing 14" and the pedal 28', is identical with the caster of FIGS. 1 and 2. The bearing 14" has a second annulus of rolling elements 50 which are installed between the abutment 16 of the support 15-17 and the underside of the web 50.

The pedal 28' constitutes or resembles a two-armed lever having a first motion receiving platform 29 which is to be depressed in order to move the shaft 12 to the (first) end position which is shown in FIG. 5, and a second motion receiving platform 41 which can be depressed in order to move the shaft 12 to the other end position in which the peripheral surface of the wheel 10 is spaced part from the plate-like brake member 35 and the latter is free to descend by gravity so as to become disengaged from the abudtment 16. The second portion of the illustrated section of the two-armed pedal 28' is denoted by the reference character 40. An advantage of the pedal 28' is that it can be stepped upon (at 29 or at 41) in order to move ths shaft 12 to the first or to the second end position. This is often more convenient than the task of pulling a one-armed pedal of the type shown in FIGS. 1 to 4.

Figure 6:
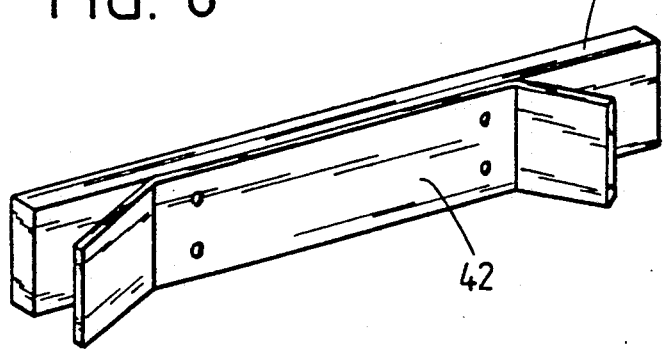
FIG. 6 is a perspective view of a modified brake which can be utilized in the caster of FIGS. 1-2, FIGS. 3-4 or FIG. 5.

The improved caster is susceptible of many additional modifications without departing from the spirit of the invention. For example, and as shown in FIG. 6, the projections 36, 37 can be replaced with an elongated leaf spring 42 which is resistance welded, spot welded or otherwise rigidly secured to one side of the plate-like brake member 35 and the end portions of which are suitably bent so as to perform the functions of the projections 36, 37, i.e., to cooperate with the inner sides of the adjacent legs 21 (not shown in FIG. 6) in order to limit the extent of movability of the member 35 in parallelism with the axis of the wheel. An advantage of the brake member 35 which is shown in FIG. 6 is that it can be assembled with the projections (end portions of leaf spring 42) prior to insertion into the frame 11 for the wheel 10. All that is necessary is to temporarily depress the leading end portion of the leaf spring 42 during introduction of the brake member 35 of FIG. 6 into the frame 11 through the slot 34 in one of the legs 21 in a direction toward the slot 34 in the other leg.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A caster for mobile scaffolds and like structures, comprising a support connectable to a mobile structure; a wheel frame having a portion adjacent said support; a bearing connecting said portion of said frame to said support for angular movement about a first axis, said frame further having two legs rigid with and extending from said portion in a direction away from said support, each of said legs having an elongated slot extending substantially transversely of said first axis; a shaft extending into and being movable in said slots substantially transversely of said first axis; a wheel mounted on said shaft for rotation between said legs about a second axis which is normal to said first axis; a brake mounted in said frame and being movable by said wheel into and from frictional engagement with said support and with said wheel in response to movement of said shaft between first and second positions relative to said frame; and means for moving said shaft between said positions.

2. The caster of claim 1, wherein said support includes a fastener defining said first axis and an abutment rigid with said fastener and being frictionally engaged by said brake in the first position of said shaft.

3. The caster of claim 1, wherein said brake includes a plate having a substantially rectangular cross-sectional outline.

4. The caster of claim 3, wherein said plate is elongated and said legs have aligned guide slots adjacent said bearing, said plate having end portions movably received in the guide slots of said legs.

5. The caster of claim 4, wherein said guide slots are substantially parallel to said first axis.

6. The caster of claim 4, wherein said guide slots are adjacent said first axis.

7. The caster of claim 1, wherein said bearing comprises a race which is rotatable relative to said support about said first axis and further comprising means for securing said race to said frame, said brake including a first member which is reciprocably guided by said frame and is frictionally engaged by said wheel in the first position of said shaft and a second member which is biased by said first member against said support in the first position of said shaft.

8. The caster of claim 7, wherein said bearing further comprises a second race which is part of said support and at least one annulus of rolling elements between said races.

9. The caster of claim 8, wherein said second member of said brake bears upon said second race in the first position of said shaft.

10. The caster of claim 7, wherein said first member includes a plate and said second member includes a pin which is reciprocable relative to and extends through said race and said portion of said frame.

11. The caster of claim 1, wherein said brake includes a member which is reciprocably mounted in said legs for movement substantially radially of said wheel and further comprising means for limiting the movability of said member relative to said frame in parallelism with said second axis.

12. The caster of dlaim 11, wherein said limiting means comprises projections on said member.

13. The caster of claim 12, wherein said legs have inner sides flanking said wheel and guide slots for said member, said projections being adjacent the inner sides of said legs.

14. The caster of claim 13, wherein said member comprises a leaf spring and said projections constitute portions of said leaf spring.

15. The caster of claim 1, wherein said moving means comprises a pedal which is pivotably mounted on said frame and has slots for said shaft.

16. The caster of claim 15, wherein said pedal includes a first motion receiving portion which is depressible to move said shaft to said first position and a second motion receiving portion which is depressible to move said shaft to said second position.

17. The caster of claim 15, wherein said pedal is a two-armed lever.

18. The caster of claim 1, wherein said first axis is substantially vertical and said second axis is substantially horizontal, said bearing including a first race forming part of said support, a second race rigid with said portion of said frame, and at least one annulus of rolling elements between said races.

* * * * *